Patented Nov. 16, 1948

2,453,904

UNITED STATES PATENT OFFICE 2,453,904

ELECTROLYTIC PREPARATION OF CORROSION TESTING ELEMENTS

Leo D. Grenot, Oakland, Calif., assignor to Shell Development Company, San Francisco, Calif., a corporation of Delaware No Drawing. Application April 5, 1944, Serial No. 529,874

4 Claims. (Cl. 204—53)

The present invention relates to corrosion testing elements and more particularly to methods for preparing corrosion testing elements suitable for testing the corrosivity of lubricating oils with respect to bearing metals.

In many industrial processes, in the operation of internal combustion engines and in numerous other instances, metal parts of equipment are in contact, either constantly or intermittently, with substances which are either corrosive or become so after a period of use. Accordingly, it has been common practice in the past to attempt to determine the rate of corrosion of the metal parts by various means in order to take steps to modify the corrosive conditions, in the event that the rate of corrosion increases to a point where substantial damage to the metal parts will take place over a short time interval. For example, U. S. Patent 1,972,728 describes a method of determining corrosion rate wherein non-corrodible buttons are inserted within a vessel which is to be subjected to the action of a corrosive material, the interior of the vessel being periodically examined thereafter and the buttons used as bench marks to determine the rate at which the interior of the vessel is being attacked by the corrosive material. In operating internal combustion engines the lubricating oil in the crankcase gradually deteriorates until it begins to have a definite corrosive action upon the bearing metals within the engines. It has been a practice, therefore, in order to determine the corrosivity of the oil, to insert specimens of the bearing metals in the oil and maintain them under controlled temperature conditions for a period of time, usually a matter of days or weeks, periodic visual examinations being made to determine the condition of the bearing metal. This method is considered unsatisfactory both from the viewpoint of the time consumed and the fact that it does not yield quantitative results for comparative purposes.

Chemical tests are also used to determine the rate of corrosion of petroleum products and lubrication, as for example the commonly used neutralization number (A. S. T. M. designation: D188-41T) which is indicative of the quantity of acid or alkali required to neutralize a given quantity of oil. This test is considered unreliable for purposes of indicating the likelihood of corrosion in view of the fact that it has been found that in many instances, in comparing two oils, the one having the lower neutralization number is actually more corrosive in its action on bearing metals than the oil having the higher indication of acidity or alkalinity. The above systems and others that have been proposed all have certain disadvantages and drawbacks such as, for example, excessive time consumed in making the test, unreliablity as indication of the actual degree of corrosivity, lack of quantitative results for comparative purposes, complicated and expensive installations, etc.

It is an object of the present invention to provide methods for preparing a test element which will provide a positive indication of corrosive conditions under operating conditions of the system which is to be tested. A further object is to provide a method for preparing a large number of the desired test elements simultaneously. A still further object is to provide a method for preparing test elements providing improved reading value in use.

Other objects, together with some of the advantages to be derived from utilizing the present invention, will become apparent in the following detailed description thereof.

For purposes of illustration the invention will be described primarily with reference to the preparation of a test element for use in determining the corrosivity of lubricating oils with reference to the bearing metals in common use at present. It is to be understood, however, that the principle involved may be applied to the preparation and use of suitable test element for determining the corrosivity of any corrosive substance with reference to any given metal or combination of metals.

Briefly the present invention comprises the deposition, by electrical means, of a quantity of the metal which is to be tested upon a suitable carrier, the deposition being carried out in such a manner as to provide a thin wedge of the metal which ranges in thickness from the order of millionths of an inch at its thinnest end to thousandths at the thickest end. The test element thus formed may either be inserted directly in equipment being tested at a point where the metal of the equipment is in contact with a corrosive substance, or, if this is impracticable, the test element may be utilized in a small scale duplicate system in which similar operating conditions are maintained.

In those instances where a galvanic couple between two metals is formed and galvanic phenomena must, as a result, be considered as factors in determining corrosion rates, as it sometimes true in the case of engine bearings, one of the metals is preferably utilized as the carrier and the other (usually the one most susceptible to corrosion) deposited thereon. For example, if lead-copper bearings are used in an engine, a test element for determining the corrosivity of the lubricating oil may be prepared by depositing a lead wedge upon a strip of copper. Similarly, if cadmium-nickel or cadmium-silver bearings are used, cadmium wedges may be deposited upon either nickel or silver as the case may be. In this manner a test element may be prepared which will provide a corrosion rate indication which may be directly applied to the corrosion rate of the bearings themselves, galvanic factors being thus included in the test element. A suitable porosity in the layer of deposited metal is required in order to provide reasonably short electrolytic paths in media of low electrolytic conductivity.

*Example*

A lead plating bath was prepared having the following composition:

| | | |
|---|---|---|
| Basic lead carbonate | grams | 120 |
| Hydrofluoric acid (50% conc.) | do | 192 |
| Boric acid | do | 84 |
| Glue | do | 0.15 |
| Water to make | cc | 800 |

A cleaned copper strip, the dimensions of which were 2½ inches by 3½ inches, was lacquered on one side and positioned in the plating bath spaced 5 inches from a lead anode having dimensions of 2½ inches by 3 inches. Employing a 950 milliampere current and a plating time of 4.8 seconds, the copper strip was plated with a coating of lead having a thickness of 0.000003 inch. The copper strip was then removed from the plating bath, washed in water and alcohol and dried.

The copper strip was then supported with the lower ½ inch of the length thereof immersed in the plating bath and plated for a period of 64 seconds using a 135 milliampere current. The strip was then lowered into the bath another ½ inch and plated for 36.8 seconds using a 273 milliampere current. The strip was then further submerged by ½ inch increments until all but ½ inch thereof had been plated, thus providing 4 additional steps in which plating times of 20.8, 16.0, 11.2 and 6.4 seconds and 405, 543, 678 and 815 milliamperes of current respectively utilized.

In this manner a test strip was produced which was provided with 7 plated lead steps having thickness as follows: 0.000003, 0.000007, 0.000014, 0.000024, 0.000037, 0.000060 and 0.000100 inch. By varying the current to provide a constant current density with respect to the area of surface being plated, as set forth in the above example, a very uniform plating was obtained.

The plated strip prepared as described above was cut lengthwise into 10 testing elements, each having dimensions of 3½ inches by ¼ inch. It is also advantageous to scratch or score the width of the copper strip at ½ inch increments corresponding to the levels of submergence before carrying out the plating procedure, these markings serving to prevent "creep" of the liquid interface up the strip during the plating and thereby giving a sharper division between the steps. When the test element is in use, these markings also serve to indicate more clearly and at a glance the number of plated steps which have been removed by the corrosive agent to which the test element is subjected.

By way of example, when it is desired to test the corrosivity of an oil in an engine which includes copper-lead bearings, a previously prepared test element is simply inserted in the crankcase of the engine either attached to the oil dip-stick or in any other suitable manner and allowed to remain there for a period of one hour. After removal from the crankcase at the end of the hour interval, the test element is examined visually and the amount of lead which has been removed by the oil noted. This may be easily determined since the copper surface will be visible where the lead has been removed. Thus, if a test element having lead deposited on copper with the thinnest step of the lead wedge having a thickness of approximately .000002 inch and the thickest step .0002 inch is examined after exposure to the crankcase oil in an engine and it is found that the lead has been removed only from the thinnest step of the stepwedge, it is then known that the oil will corrode lead in the presence of copper at the rate of .000002 inch per hour. Since it has been established that a corrosion rate of .0002 inch per hour of lead at engine operating temperatures (about 140° C.) takes place in the presence of a severely corrosive oil and a corrosion rate of .00002 inch per hour of lead is considered to indicate a mildly corrosive oil, an oil which the test element indicates causes a corrosion rate of only .000002 inch per hour may be classified as non-corrosive and suitable for further use in engines with crank case temperatures in the range of from 120 to 140° C. Times of testing and interpretation of results with engines operating at other crank case temperatures must be established according to the particular requirements of the engine.

If severe localized corrosion, commonly known as "pitting," occurs, the approximate depth of the pits may be determined by measuring the distance of the deepest pit from one end of the wedge and calculating the metal thickness of the wedge at this point.

The thickness range of the wedge which is to be deposited in preparing a given test element will vary, for optimum results, with different test metals and carriers. In general, best results are attained if the wedge is adjusted so that at its thinnest end it satisfacorily covers the carrier and is clearly visible, the other end being somewhat thicker in inches than the greatest corrosion rate under severely corrosive conditions which will occur during a given suitable time interval. As has been pointed out above, the carrier is preferably formed of a relatively inert material such as glass or the like, although this term is intended to include other materials, such as suitable metals, which are relatively inert to the corrosive conditions which are being tested for the time interval necessary for proper utilization of the test element. For example, in the instances described above where copper is used as a carrier material for lead test wedges, the copper may also be attacked eventually by a corrosive oil. However, for the period of the test, i. e. one hour, the copper may be considered relatively inert as compared to the lead. In many instances, particularly if the carrier has a thickness of at least of the order of hundredths of an inch and preferably of the order of tenths of an inch, the rate of corrosion of the carrier will have little, if any, effect upon the corrosion rate reading obtained on the metal wedge of the test element, in which cases it is not necessary to utilize a carrier formed of a relatively inert material.

In the step wedge type of test element (described above), it has been found advantageous to utilize a carrier in the form of a flat strip. Indicia may then be etched, stamped or otherwise marked on the carrier at given intervals, each interval corresponding to a step on the step wedge which is thereafter deposited and each indicium corresponding to the actual thickness of the metal in each step of the step wedge. In this manner a close approximation of the corrosion rate of a corrosive material with relation to a given metal may easily be determined by an inexperienced person by simply inserting the test element in the suspectedly corrosive material for a suitable period of time and then visually inspecting it, the indicium on the last corroded step of the step wedge giving the corrosion rate for the time interval elapsed.

I claim as my invention:

1. In a method of preparing a corrosion testing element of the class described, electroplating a test metal on a metal carrier having linear scorings at predetermined intervals to form a thin stepped-wedge plating of test metal thereon by immersing said carrier by predetermined increments corresponding to said linear scorings to bring said scorings successively substantially to the level of the plating bath and electrically depositing test metal on the immersed portion of said carrier in a predetermined amount after each successive immersion, thereby forming a test metal step-wedge on said carrier, the steps of said wedge coinciding with said scorings.

2. The method according to claim 1 wherein the carrier is a copper strip and the test metal is lead.

3. In a method of preparing a corrosion testing element of the class described, electroplating a test metal on a metal carrier having linear scorings at predetermined intervals in a plating bath to form a thin plating of test metal extending substantially the length of said carrier, removing the plated carrier from the bath, and electroplating additional amounts of test metal on said plated carrier to form a thin stepped-wedge plating thereon by immersing said carrier by predetermined increments corresponding to said linear scorings to bring said scorings successively substantially to the level of the plating bath and electrically depositing test metal on the immersed portion of said carrier in a predetermined amount after each successive immersion, thereby forming a test metal step-wedge on said carrier, the steps of wedge coinciding with said scorings.

4. In a method of preparing a corrosion testing element of the class described, electroplating a test metal on a metal carrier having one side lacquered and having linear scorings at predetermined intervals on the other side in a plating bath to form a thin plating of test metal on the scored side extending substantially the length of said carrier, removing the plated carrier from the bath, and electroplating additional amounts of the same test metal on the scored side of said plated carrier to form a thin stepped-wedge plating thereon by immersing said carrier by predetermined increments corresponding to said linear scorings to bring said scorings successively substantially to the level of the plating bath and electrically depositing test metal on the immersed portion of said carrier in a predetermined amount after each successive immersion, thereby forming a test metal step-wedge on said carrier, the steps of wedge coinciding with said scorings.

LEO D. GRENOT.

REFERENCES CITED

The following references are of record in the file of this patent:

UNITED STATES PATENTS

| Number | Name | Date |
|---|---|---|
| 1,939,902 | Kaul | Dec. 19, 1933 |
| 2,087,919 | Mascuch et al. | July 27, 1937 |
| 2,138,938 | Plensler | Dec. 6, 1938 |
| 2,351,644 | Talley et al. | June 20, 1944 |